United States Patent
Beppu et al.

(10) Patent No.: US 10,625,949 B2
(45) Date of Patent: Apr. 21, 2020

(54) TRANSFER APPARATUS AND STORAGE APPARATUS

(71) Applicant: Azbil Corporation, Tokyo (JP)

(72) Inventors: Hisashi Beppu, Tokyo (JP); Yoichi Okawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 106 days.

(21) Appl. No.: 16/085,066

(22) PCT Filed: Mar. 25, 2016

(86) PCT No.: PCT/JP2016/059726
§ 371 (c)(1),
(2) Date: Sep. 14, 2018

(87) PCT Pub. No.: WO2017/163420
PCT Pub. Date: Sep. 28, 2017

(65) Prior Publication Data
US 2019/0071253 A1    Mar. 7, 2019

(51) Int. Cl.
*B65G 25/04* (2006.01)
*F16H 49/00* (2006.01)
(Continued)

(52) U.S. Cl.
CPC ............ *B65G 25/04* (2013.01); *F16H 49/00* (2013.01); *H02K 7/06* (2013.01); *H02K 49/102* (2013.01)

(58) Field of Classification Search
CPC ........ B65G 54/02; B65G 47/82; B65G 25/04; B65G 23/20; F26B 5/06; H02K 7/06; H02K 49/102; H02K 41/02; F16H 2025/249
See application file for complete search history.

(56) References Cited

U.S. PATENT DOCUMENTS 2,550,775 A    5/1951   Clark
10,336,560 B2 *  7/2019  Beppu ................ F16H 25/24
(Continued)

FOREIGN PATENT DOCUMENTS

| CA | 674539 A | 11/1963 |
|---|---|---|
| JP | 2937883 B2 | 8/1999 |
| JP | 2008-019019 A | 1/2008 |

OTHER PUBLICATIONS

European Patent Office, "Extended European Search Report," issued in European Patent Application No. 16 895 451.9, which is a European Counterpart of U.S. Appl. No. 16/085,066 dated Oct. 18, 2019, 7 page.

(Continued)

*Primary Examiner* — Glenn F Myers
(74) *Attorney, Agent, or Firm* — Amster, Rothstein & Ebenstein LLP

(57) ABSTRACT

A transfer apparatus comprises a rod-shaped member that comprises a magnetic material, a cover, made of a nonmagnetic material, that covers the rod-shaped member, a first terminal member configured to allow insertion of one end portion of the rod-shaped member, a second terminal member configured to allow insertion of the other end portion of the rod-shaped member, and a driving device, connected to the first terminal member, that rotates the rod-shaped member about a central axis of the rod-shaped member, in which the rod-shaped member and the first terminal member are fixed to each other, the cover and the first terminal member are fixed to each other, the rod-shaped member and the second terminal member are not fixed to each other, and the cover and the second terminal member are fixed to each other.

17 Claims, 8 Drawing Sheets

(51) Int. Cl.
    *H02K 7/06*     (2006.01)
    *H02K 49/10*    (2006.01)

(56) References Cited

U.S. PATENT DOCUMENTS

| 2011/0193425 A1* | 8/2011 | Hiura | H02K 41/031 |
| | | | 310/12.01 |
| 2013/0175886 A1* | 7/2013 | Kakiuchi | H02K 41/031 |
| | | | 310/12.18 |

OTHER PUBLICATIONS

The State Intellectual Property Office of People's Republic of China, "The Second Office Action", issued in Chinese Patent Application No. 201680083631.1, which is a counterpart to U.S. Appl. No. 16/085,066, dated Dec. 30, 2019, 11 pages (6 pages of English Translation of Office Action and 5 pages of Original Chinese Office Action).
International Search Report received for PCT Patent Application No. PCT/JP2016/059726 dated Jun. 21, 2016, 2 pages (1 page of English Translation of International Search Report and 1 page of Original International Search Report).

\* cited by examiner

TRANSFER APPARATUS AND STORAGE APPARATUS

CROSS-REFERENCE TO RELATED APPLICATIONS

This application is a National Stage entry under 35 U.S.C, 371 of International Patent. Application No. PCT/W2016/059726, filed on Mar. 25, 2016, the entire contents of which is incorporated by reference herein.

TECHNICAL FIELD

The present invention relates to a transfer technique, more particularly to a transfer apparatus and a storage apparatus.

BACKGROUND ART

In a transfer apparatus using a magnetic screw, a male screw made of a magnetic material is rotated to move a nut made of a magnetic material in a direction of a central axis of the male screw. The male screw made of a magnetic material may be covered with a cover having a cylindrical shape and made of a nonmagnetic material so as to move the nut smoothly or prevent corrosion of the male screw (see, for example, PTL 1).

CITATION LIST

Patent Literature

PTL 1. Japanese Patent No. 2937883

SUMMARY OF INVENTION

Technical Problem

Mandrels made of a nonmagnetic material are connected to both ends of a male screw made of a magnetic material and a driving device for rotating the male screw may be connected to one of the mandrels. Here, the heat expansion ratio of the male screw made of a magnetic material is different from the heat expansion ratio of a cover or mandrel made of a nonmagnetic material. Accordingly, when the male screw is fixed to the cover or the mandrel completely, a stress is produced due to a difference between the heat expansion ratios, thereby causing distortion or breakage. Therefore, one end of the male screw, the mandrel, or the cover is often fixed and the other end thereof is released to relax a heat stress. However, the inventor et al. have found that, when the shaft end connected to the driving device is released and the other shaft end is fixed, a twist of the cover may reduce the positioning accuracy of the relative position between the rod-shaped member such as the male screw and an opposite member such as a female screw. Accordingly, it is one of objects of the present invention to provide a transfer apparatus and a storage apparatus capable of relaxing a stress that may be caused by heat expansion and contraction without reducing the positioning accuracy of a movable portion.

Solution to Problem

According to an aspect of the invention, there is provided a transfer apparatus comprising (a) a rod-shaped member that comprises a magnetic material, (b) a cover configured to cover the rod-shaped member, the cover being made of a nonmagnetic material, (c) a first terminal member configured to allow insertion of one end portion of the rod-shaped member, (d) a second terminal member configured to allow insertion of the other end portion of the rod-shaped member, and (e) a driving device configured to be connected to the first terminal member and rotate the rod-shaped member about a central axis of the rod-shaped member, in which (f) the rod-shaped member and the first terminal member are fixed to each other, (g) the cover and the first terminal member are fixed to each other, (h) the rod-shaped member and the second terminal member are not fixed to each other, (i) the cover and the second terminal member are fixed to each other.

In the transfer apparatus described above, a concave portion configured to allow insertion of the other end portion of the rod-shaped member may be provided in the second terminal member, and an insertion depth of the other end portion of the rod-shaped member may be smaller than a depth of the concave portion of the second terminal member, so that an end surface surrounding the concave portion of the second terminal member does not have to make contact with the rod-shaped member.

In the transfer apparatus described above, the rod-shaped member and the first terminal member may be fixed to each other by welding. The rod-shaped member and the first terminal member may be fixed to each other by a fastening pin. The rod-shaped member may make contact with the second terminal member via a key.

In the transfer apparatus described above, the first terminal member and the second terminal member may be made of a nonmagnetic material.

In the transfer apparatus described above, the cover and the first terminal member may be fixed to each other by welding. The cover and the second terminal member may be fixed to each other by welding.

The transfer apparatus described above may further comprise a first bearing configured to receive a load of the first terminal member and a second bearing configured to receive a load of the second terminal member. The transfer apparatus may further comprise an opposite member configured to face a part of a side surface of the rod-shaped member, the opposite member comprising a magnetic material, in which the opposite member may move along the central axis of the rod-shaped member when the driving device rotates the rod-shaped member.

In addition, according to an aspect of the invention, there is provided a storage apparatus comprising (a) a storage housing that stores an article, (b) a rod-shaped member that comprises a magnetic material, (c) a cover configured to cover the rod-shaped member, the cover being made of a nonmagnetic material, (d) a first terminal member configured to allow insertion of one end portion of the rod-shaped member, (e) a second terminal member configured to allow insertion of the other end portion of the rod-shaped member, (f) an opposite member configured to face a part of a side surface of the rod-shaped member, the opposite member comprising a magnetic material, (g) a driving device configured to be connected to the first terminal member, rotate the rod-shaped member about a central axis of the rod-shaped member, and change a relative position between the rod-shaped member and the opposite member, and (h) a contact member configured to move in the storage housing with a change in the relative position between the rod-shaped member and the opposite member and moves the article while making contact with the article, in which (i) the rod-shaped member and the first terminal member are fixed to each other, (j) the cover and the first terminal member are fixed to each other, (k) the rod-shaped member and the second terminal member are not fixed to each other, and (l) the cover and the second terminal member are fixed to each other.

In the storage apparatus described above, a concave portion configured to allow insertion of the other end portion of the rod-shaped member may be provided in the second terminal member, and an insertion depth of the other end portion of the rod-shaped member may be smaller than a depth of the concave portion of the second terminal member, so that an end surface surrounding the concave portion of the second terminal member does not have to make contact with the rod-shaped member.

In the storage apparatus described above, the first terminal member and the second terminal member may be made of a nonmagnetic material.

The storage apparatus described above may further comprise a first bearing configured to receive a load of the first terminal member and a second bearing configured to receive a load of the second terminal member.

In the storage apparatus described above, the driving device may be disposed outside the storage housing. The rod-shaped member, the opposite member, and the contact member may be disposed in the storage housing.

In the storage apparatus described above, the storage housing may be a temperature-controlled furnace having a temperature-controlled space.

Advantageous Effects of Invention

According to the invention, it is possible to provide a transfer apparatus and a storage apparatus capable of relaxing a stress that may be caused by heat expansion and contraction without reducing the positioning accuracy of a movable portion.

DESCRIPTION OF EMBODIMENTS

Figure 1:
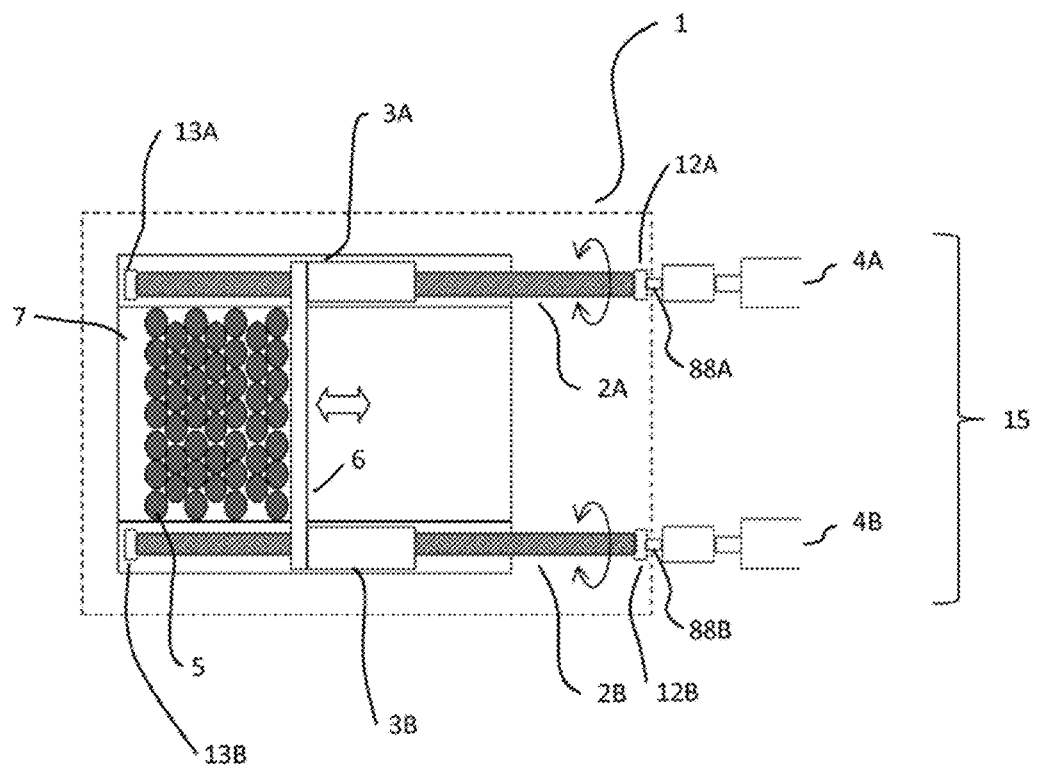
FIG. 1 is a schematic plan view illustrating a storage apparatus according to an embodiment of the invention.

Embodiments of the invention will be described below. In the following description of the drawings, the same or similar parts are denoted by the same or similar reference numerals. However, the drawings are schematically illustrated. Therefore, specific dimensions and the like should be determined with reference to the following description. It will be appreciated that the relationship or ratio between dimensions may be different among the drawings.

The storage apparatus according to the embodiment of the invention comprises a storage housing 1 that stores articles 5 and a transfer apparatus 15 that transfers the articles 5, as illustrated in FIG. 1. The storage housing 1 is, for example, a temperature-controlled furnace having a temperature-controlled space that houses the articles 5. The temperature-controlled furnace is, for example, a freeze-drying furnace. For example, a horizontal shelf board 7 is disposed in the storage housing 1 and the articles 5 comprising an object to be freeze-dried are disposed on the shelf board 7. The articles 5 are, for example, vials containing a medicine poured therein.

The transfer apparatus 15 comprises rod-shaped members 2A and 2B that comprise a magnetic material, a cover 20A, made of a nonmagnetic material, that covers the rod-shaped member 2A, a cover, made of a nonmagnetic material, that covers the rod-shaped member 2B, opposite members 3A and 3B, comprising a magnetic material, that face parts of side surfaces of the rod-shaped members 2A and 2B, a driving device 4A that rotates the rod-shaped member 2A about a central axis and changes a relative position between the rod-shaped member 2A and the opposite member 3A, a driving device 4B that rotates the rod-shaped member 2B about a central axis and changes a relative position between the rod-shaped member 2B and the opposite member 3B, and the contact member 6 that moves in the storage housing 1 with changes in the relative positions between the rod-shaped members 2A and 2B and the opposite members 3A and 3B and moves the articles 5 while making contact with the articles 5. The driving devices 4A and 4B are disposed, for example, outside the storage housing 1.

Figure 2:
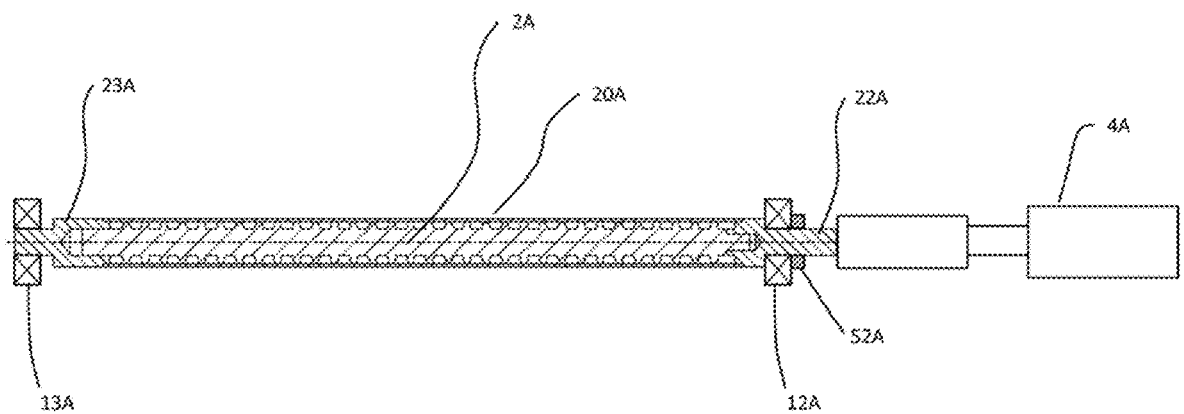
FIG. 2 is a schematic cross-sectional view illustrating a transfer apparatus according to the embodiment of the invention.

As illustrated in FIG. 2, the transfer apparatus 15 further comprises a first terminal member 22A configured to allow insertion of one end portion of the rod-shaped member 2A and a second terminal member 23A configured to allow insertion of the other end portion of the rod-shaped member 2A. The driving device 4A is connected to the first terminal member 22A to rotate the rod-shaped member 2A about the central axis of the rod-shaped member 2A via the first terminal member 22A. In the following description, the sides of the rod-shaped members 2A and 2B connected to the driving devices 4A and 4B may be referred to as the driving sides and the sides opposite to the sides of the rod-shaped members 2A and 2B connected to the driving devices 4A and 4B may be referred to as the opposite driving sides.

Figure 3:
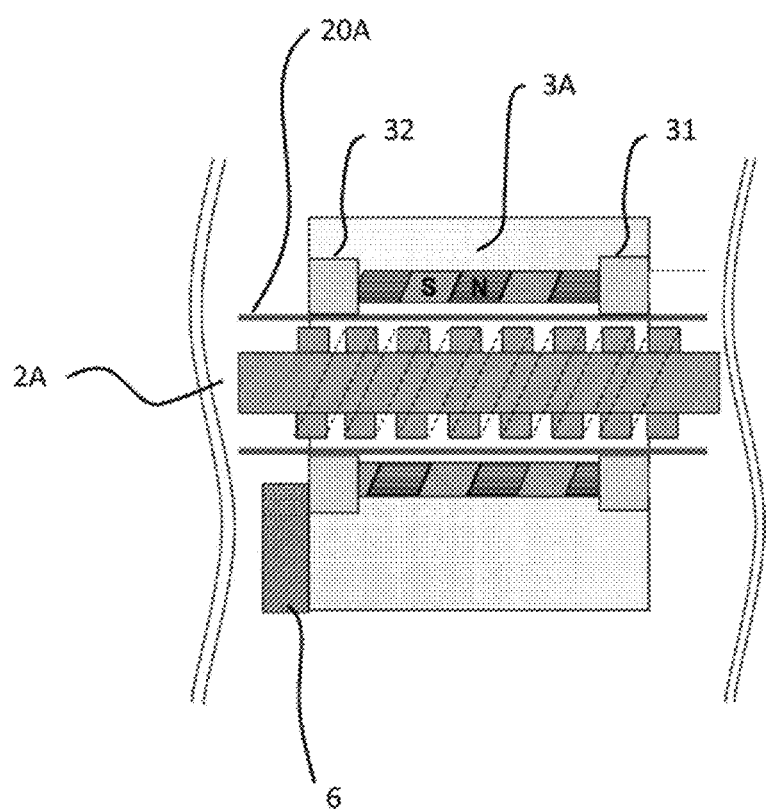
FIG. 3 is a schematic cross-sectional view illustrating a rod-shaped member and an opposite member according to the embodiment of the invention.
Figure 4:
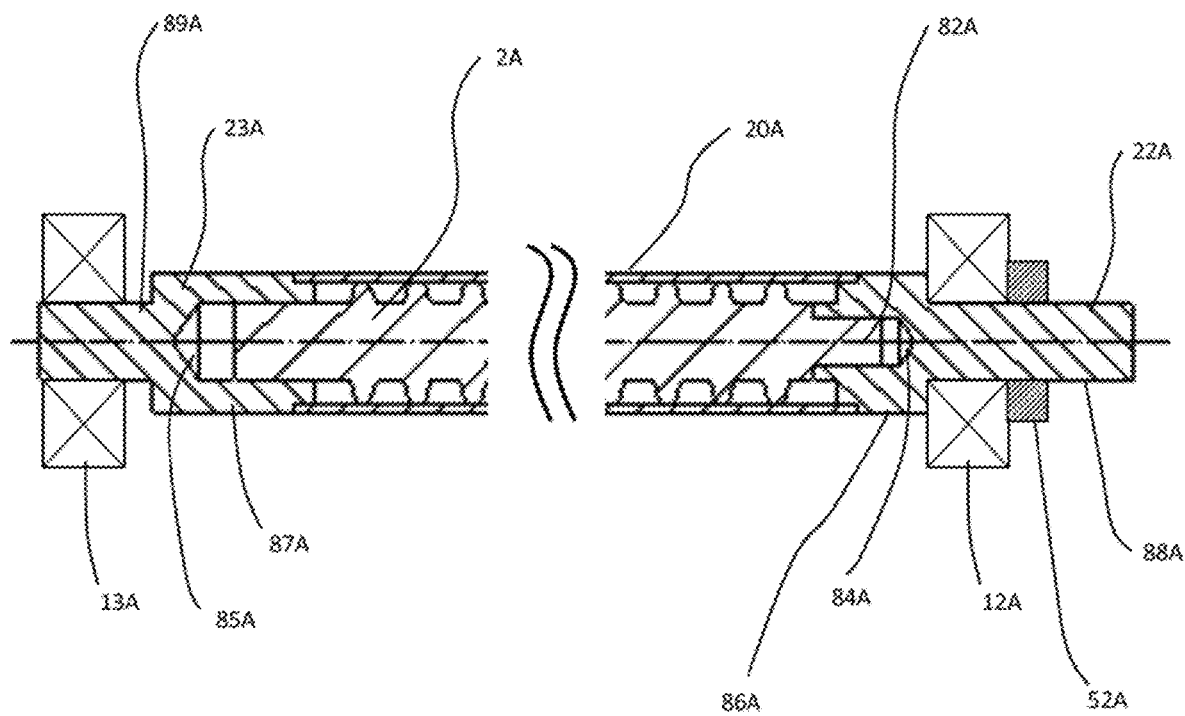
FIG. 4 is a schematic cross-sectional view illustrating the transfer apparatus according to the embodiment of the invention.

As illustrated in FIG. 3, the rod-shaped member 2A is a magnetic screw comprising a magnetic material and the outer peripheral surface thereof is threaded in a spiral shape. As illustrated in FIG. 4, one end portion of the rod-shaped member 2A is provided with a projection 82A. The outside shape of the projection 82A is a circle and has an outer circumference smaller than in the main body of the rod-shaped member 2A. The central axis of the projection 82A is aligned with the central axis of the main body of the rod-shaped member 2A. The cover 20A is, for example, a thin-walled pipe of a nonmagnetic material made of stainless steel, aluminum, resin, or the like. The rod-shaped member 2A is inserted into the cylindrical cover 20A. The central axis of the rod-shaped member 2A is aligned with the central axis of the cover 20A. When the rod-shaped member 2A rotates, the cover 20A also rotates about the central axis of the rod-shaped member 2A.

The first terminal member 22A is provided with a concave portion 84A therein and comprises an engagement portion 86A having a part with an outer diameter identical to that of the cover 20A and a projecting mandrel portion 88A with an outer diameter smaller than that of the engagement portion 86A. The engagement portion 86A and the mandrel portion 88A are integrated with each other. The outside shapes of the engagement portion 86A and the mandrel portion 88A are circles and the center of the outside shape of the engagement portion 86A and the center of the outside shape of the mandrel portion 88A are aligned on an identical line. The first terminal member 22A is made of a nonmagnetic material such as stainless steel, aluminum, or resin.

The concave portion 84A of the first terminal member 22A has a circular cross section and has an inner diameter identical to the outer diameter of the projection 82A of one end portion of the rod-shaped member 2A. The projection 82A of one end portion of the rod-shaped member 2A is inserted into the concave portion 84A of the first terminal member 22A. Here, the insertion depth of the projection 82A of one end portion of the rod-shaped member 2A is smaller than the depth of the concave portion 84A of the first terminal member 22A. Therefore, a space is present between the end surface of the projection 82A of the rod-shaped member 2A and the bottom surface of the concave portion 84A of the first terminal member 22A. Here, the end surface is a surface orthogonal to the central axis of the rod-shaped member 2A and this is also true in the following description.

In addition, the engagement portion 86A of the first terminal member 22A is provided with a step having a height identical to the thickness of the cover 20A. The outside shape of the step portion is also a circle. The outer diameter of the part of the engagement portion 86A reduced in diameter by the step is identical to the inner diameter of the cover 20A. The outer diameter of the part of the engagement portion 86A increased in diameter by the step is identical to the outer diameter of the cover 20A. The part of the engagement portion 86A of the first terminal member 22A reduced in diameter by the step is inserted inside the cover 20A.

The second terminal member 23A is provided with a concave portion 85A therein and comprises an engagement portion 87A having a part with an outer diameter identical to that of the cover 20A and a projecting mandrel portion 89A with an outer diameter smaller than that of the engagement portion 87A. The engagement portion 87A and the mandrel portion 89A are integrated with each other. The outside shapes of the engagement portion 87A and the mandrel portion 89A are circles and the center of the outside shape of the engagement portion 87A and the center of the outside shape of the mandrel portion 89A are aligned on an identical line. The second terminal member 23A is made of a nonmagnetic material such as stainless steel, aluminum, or resin.

The concave portion 85A of the second terminal member 23A has a circular cross section and has an inner diameter identical to the outer diameter of the other end portion of the rod-shaped member 2A. The other end portion of the rod-shaped member 2A is inserted into the concave portion 85A of the second terminal member 23A. Here, the insertion depth of the other end portion of the rod-shaped member 2A is smaller than the depth of the concave portion 85A of the second terminal member 23A. Accordingly, a space is present between the end surface of the other end portion of the rod-shaped member 2A and the bottom surface of the concave portion 85A. In addition, the end surface surrounding the concave portion 85A of the second terminal member 23A does not make contact with the rod-shaped member 2A.

In addition, the engagement portion 87A of the second terminal member 23A is provided with a step having a height identical to the thickness of the cover 20A. The outside shape of the step portion is a circle. The outer diameter of the part of the engagement portion 87A reduced in diameter by the step is identical to the inner diameter of the cover 20A. The outer diameter of the part of the engagement portion 87A increased in diameter by the step is identical to the outer diameter of the cover 20A. The part of the engagement portion 87A of the second terminal member 23A reduced in diameter by the step is inserted inside the cover 20A.

The transfer apparatus 15 further comprises a first bearing 12A that receives a load of the mandrel portion 88A of the first terminal member 22A and a second bearing 13A that receives a load of the mandrel portion 89A of the second terminal member 23A. On the driving side, the first bearing 12A is tightened by a bearing nut 52A so that an end surface formed by the engagement portion 86A of the first terminal member 22A and a step of the mandrel portion 88A makes contact with an end surface of the first bearing 12A. This suppresses deviation caused by expansion and contraction in a direction of a central axis of the rod-shaped member 2A on the driving side.

In contrast, a space is provided between the end surface of the engagement portion 87A of the second terminal member 23A and the end surface of the second bearing 13A on the opposite driving side and the second bearing 13A is not, tightened by the bearing nut. This allows the rod-shaped member 2A to expand and contract in the direction of the central axis on the opposite driving side.

Figure 5:
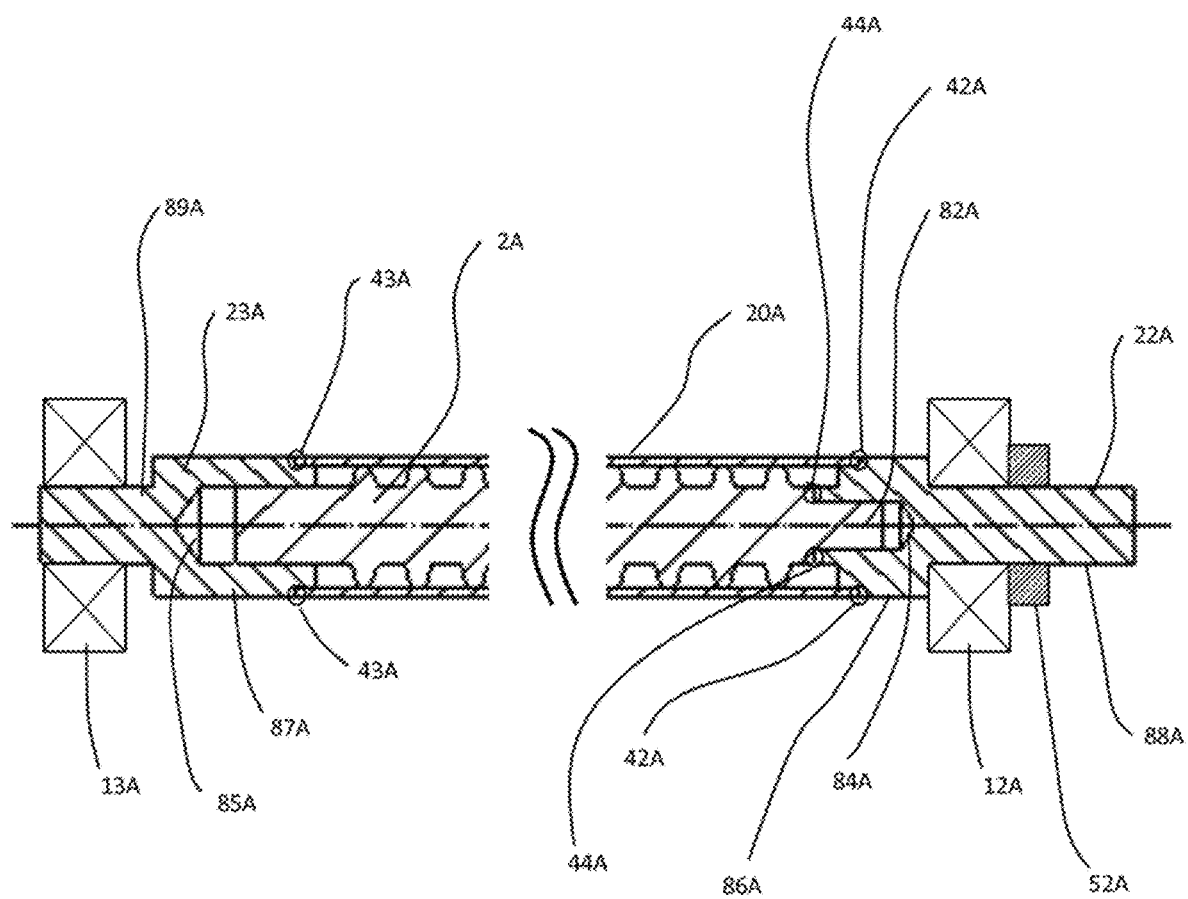
FIG. 5 is a schematic cross-sectional view illustrating the transfer apparatus according to the embodiment of the invention.

As illustrated in FIG. 5, on the driving side, a portion 42A at which the end portion of the cover 20A makes contact with the step portion of the engagement portion 86A of the first terminal member 22A is fixed by welding. In addition, on the driving side, a portion 44A at which the end surface formed by the main body of the rod-shaped member 2A and the step of the projection 82A makes contact with the end surface surrounding the concave portion 84A of the engagement portion 86A of the first terminal member 22A is fixed by welding. Since these end surfaces are fixed to each other on the driving side, deviation caused by expansion and contraction in the direction of the central axis of the rod-shaped member 2A is suppressed.

In contrast, on the opposite driving side, a portion 43A at which the end portion of the cover 20A makes contact with the step portion of the engagement portion 87A of the second terminal member 23A is fixed by welding. However, on the opposite driving side, the other end portion of the rod-shaped member 2A and the second terminal member 23A are not fixed to each other by welding or the like and the rod-shaped member 2A and the second terminal member 23A are integrated with each other only by a friction force. In addition, there is no portion at which the end surface of the rod-shaped member 2A makes contact with the end surface of the second terminal member 23A. Accordingly, on the opposite driving side, the rod-shaped member 2A is allowed to expand and contract in the direction of the central axis.

The opposite member 3A held in the storage housing 1 illustrated in FIG. 1 is a magnetic nut comprising a magnetic material and provided with a hole having an inner circumference larger than an outer circumference of the rod-shaped member 2A. The rod-shaped member 2A penetrates through a hole in the opposite member 3A having a nut shape. As illustrated in FIG. 3, S pole magnetized zones and N pole magnetized zones are alternately provided in a spiral shape on an inner peripheral surface of the hole in the opposite member 3A. The pitch of the magnetized zones of the opposite member 3A is substantially the same as the pitch of the threads of the rod-shaped member 2A. Guide rings 31 and 32 such as bushes may be provided on an inner peripheral surface of the opposite member 3A. The inner circumferences of the guide rings 31 and 32 are smaller than the inner circumference of the opposite member 3A and make contact with the outer peripheral surface of the cover 20A. Therefore, a constant interval is kept between the threads of the rod-shaped member 2A and the magnetized zones of the opposite member 3A. The guide rings 31 and 32 are made of material having a small friction coefficient, such as fluororesin.

As illustrated in FIG. 1, the rod-shaped member 2B is held by the bearings 12B and 13B in parallel with the rod-shaped member 2A in the storage housing 1. The rod-shaped member 2B is covered with a cover and has one end portion to which the first terminal member is connected and the other end portion to which the second terminal member is connected, as in the rod-shaped member 2A. Although the rod-shaped member 2B is fixed to the first terminal member by welding as in the rod-shaped member 2A on the driving side, the rod-shaped member 2B is not fixed to the second terminal member by welding or the like on the opposite driving side.

The structure of the opposite member 3B held in the storage housing 1 is similar to that of the opposite member 3A. The contact member 6 held in the storage housing 1 is a plate member and is fixed between the opposite member 3A and the opposite member 3B so as to be substantially orthogonal to the surface of the shelf board 7.

The driving devices 4A and 4B comprise, for example, rotating motors, and are disposed outside a temperature-controlled space present in the storage housing 1. The driving devices 4A and 4B may be disposed outside a casing of the storage housing 1 or may be disposed outside the temperature-controlled space and in the casing of the storage housing 1. The driving devices 4A and 4B may be covered with a shield or the like which prevents diffusion of possible dust or the like. The driving device 4A and the rod-shaped member 2A are connected to each other via, for example, the mandrel portion 88A of the first terminal member 22A that penetrates through a side wall of the storage housing 1. In addition, the driving device 4B and the rod-shaped member 2B are connected to each other via, for example, a mandrel 88B that penetrates through the side wall of the storage housing 1. The holes in the side wall of the storage housing 1 through which the mandrel portions 88A and 88B penetrate are provided with sealing members such as, for example, oil seals.

The driving devices 4A and 4B rotate the rod-shaped members 2A and 2B in synchronization with each other. When the driving device 4A rotates the rod-shaped member 2A, a magnetic force acts between the threads of the rod-shaped member 2A and the magnetized zones of the opposite member 3A. The opposite member 3A is fixed to the contact member 6 and the opposite member 3B and cannot rotate. Accordingly, when the rod-shaped member 2A is rotated, the opposite member 3A moves along the central axis of the rod-shaped member 2A. The opposite member 3A is moved to a desired position according to, for example, the relationship obtained in advance between the driving current of the driving device 4A and the position of the opposite member 3A. In addition, when the driving device 4B rotates the rod-shaped member 2B, a magnetic force acts between the threads of the rod-shaped member 2B and the magnetized zones of the opposite member 3B and the opposite member 3B moves along the central axis of the rod-shaped member 2B. The contact member 6 fixed between the opposite members 3A and 3B also moves along the central axes of the rod-shaped members 2A and 2B on the shelf board 7 as the opposite members 3A and 3B move. The articles 5 placed on the shelf board 7 are pushed by the contact member 6 and move on the shelf board 7. Furthermore, the articles 5 may be pushed to the outside of the storage housing 1 through the door of the storage housing 1.

In the transfer apparatus 15 according to the embodiment described above, although the heat expansion ratio of the rod-shaped member 2A comprising a magnetic material is different from the heat expansion ratios of the cover 20A, the first terminal member 22A, and the second terminal member 23A that are made of a nonmagnetic material, since the rod-shaped member 2A is allowed to expand and contract on the opposite driving side, it is possible to relax a stress that may be caused by differences between the heat expansion ratios. Accordingly, the transfer apparatus 15 according to the embodiment can be used even in an environment in which temperature changes significantly.

In addition, if the rod-shaped member 2A and the first terminal member 22A are not fixed to each other, the cover 20A and the first terminal member 22A are fixed to each other on the driving side, the rod-shaped member 2A and the second terminal member 23A are fixed to each other, and the cover 20A and the second terminal member 23A are fixed to each other on the opposite driving side, although the rod-shaped member 2A is allowed to expand and contract on the driving side, the rotation torque of the driving device 4A is transmitted to the rod-shaped member 2A via the cover 20A. This causes a twist of the cover 20A and a deviation of the rotation angle of the rod-shaped member 2A. Accordingly, the positioning accuracy of the opposite member 3A may be reduced.

In contrast, in the transfer apparatus 15 according to the embodiment, the rotation torque of the driving device 4A can be transmitted to the rod-shaped member 2A without loss by fixing the rod-shaped member 2A, the cover 20A, and the first terminal member 22A to each other by welding on the driving side. Accordingly, it is possible to suppress reduction in the positioning accuracy of the opposite member 3A while relaxing a heat stress. This is also true of the rod-shaped member 2B and the opposite member 3B.

In the storage apparatus according to the embodiment described above, the driving torque is transmitted between the rod-shaped members 2A and 2B and the opposite members 3A and 3B in a non-contact manner by a magnetic force. Therefore, when a driving torque is transmitted between the rod-shaped members 2A and 2B and the opposite members 3A and 3B, the heat and the dust are unlikely to be generated. Accordingly, even if the rod-shaped members 2A and 2B and the opposite members 3A and 3B are disposed in the temperature-controlled space present in the storage housing 1, it is possible to suppress an influence of heat generation in the temperature-controlled space and keep the temperature-controlled space clean.

In addition, since the driving devices 4A and 4B are disposed outside the temperature-controlled space in the storage housing 1, even if dust is generated in the driving devices 4A and 4B, the dust is unlikely to enter the temperature-controlled space present in the storage housing 1. If the driving devices are disposed in the temperature-controlled furnace, the temperature distribution may become uneven in the temperature-controlled furnace such as a freeze-drying furnace due to the heated driving devices. In this case, the quality of multiple articles disposed in the temperature-controlled furnace may become uneven. In contrast, in the storage apparatus according to the embodiment, since the driving devices 4A and 4B are disposed outside the temperature-controlled space present in the storage housing 1, the temperature is unlikely to become uneven in the storage housing 1.

In addition, in the storage apparatus according to the embodiment, the rod-shaped members 2A and 2B do not go out of the storage housing 1 when the contact member 6 is moved. Accordingly, the rod-shaped members 2A and 2B draw no foreign matters from the outside of the storage housing 1 into the storage housing 1. Therefore, the storage apparatus according to the embodiment can keep the inside of the storage housing 1 clean and suppress the unevenness of the temperature in the storage housing 1.

(First Modification)

Figure 6:
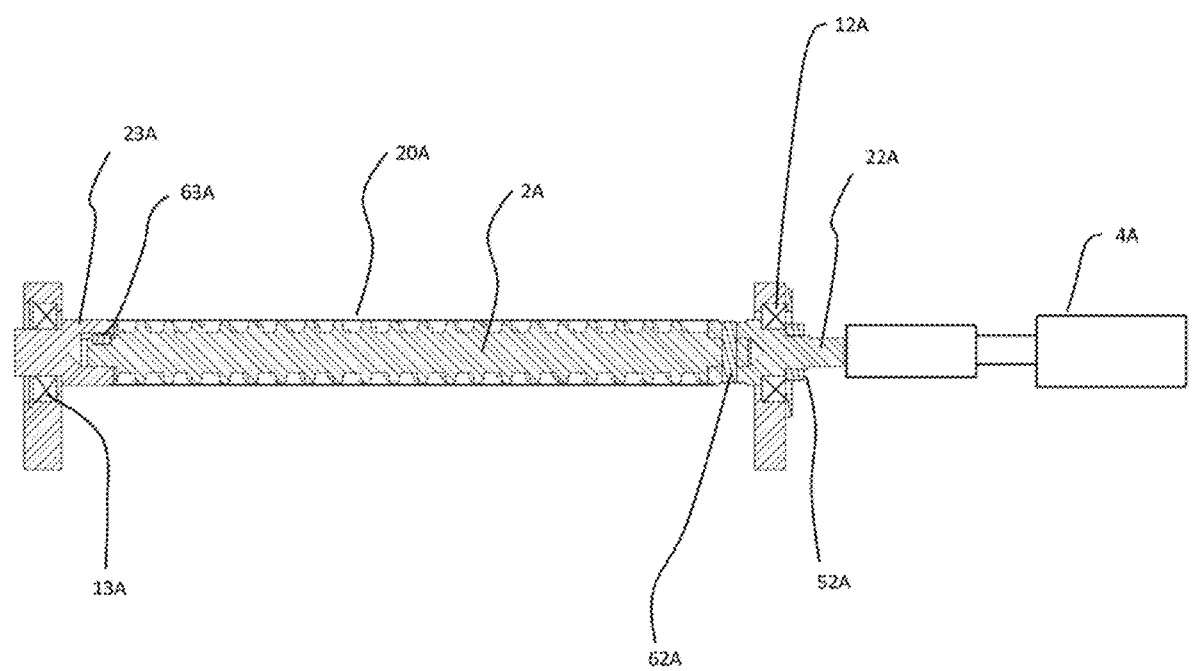
FIG. 6 is a schematic cross-sectional view illustrating a transfer apparatus according to a first modification of the embodiment of the invention.
Figure 7:
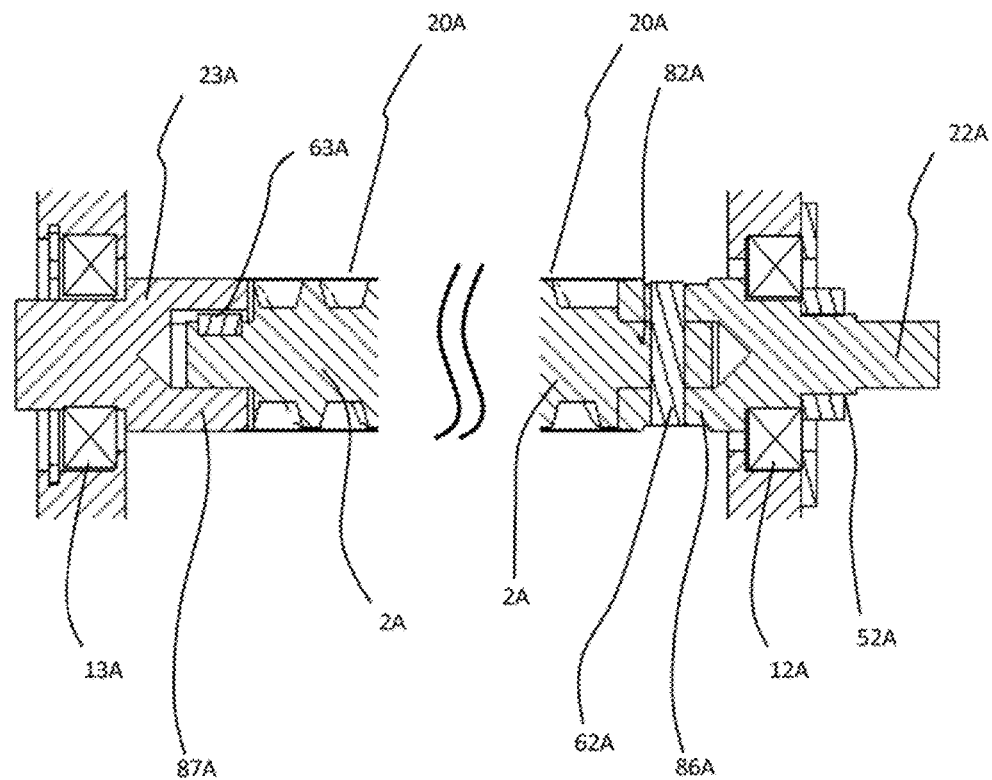
FIG. 7 is a schematic cross-sectional view illustrating the transfer apparatus according to the first modification of the embodiment of the invention.

Although FIG. 5 illustrates an example in which the portion 44A at which the rod-shaped member 2A makes contact with the engagement portion 86A of the first terminal member 22A is fixed by welding on the driving side, the fixation method is not limited to welding. For example, as illustrated in FIG. 6, the rod-shaped member 2A and the first terminal member 22A may be fixed to each other by a fastening pin 62A on the driving side. As illustrated in FIG. 7, a through-hole is provided in the projection 82A of one end portion of the rod-shaped member 2A, a through-hole is also provided in the engagement portion 86A of the first terminal member 22A, and the fastening pin 62A is inserted so as to penetrate through the through-hole in the projection 82A of one end portion of the rod-shaped member 2A and the through-hole in the engagement portion 86A of the first terminal member 22A to suppress deviation caused by expansion and contraction of the rod-shaped member 2A in the direction of the central axis. Also in this case, a portion at which the cover 20A makes contact with the engagement portion 86A of the first terminal member 22A may be fixed by welding on the driving side.

In addition, as illustrated in FIG. 6, the rod-shaped member 2A and the second terminal member 23A may make contact with each other via a key 63A on the opposite driving side. For example, as illustrated in FIG. 7, the key 63A is fitted into a key groove provided in the other end portion of the rod-shaped member 2A. On the opposite driving side, although the key 63A suppresses slippage of the second terminal member 23A when the rod-shaped member 2A rotates, the key 63A allows the rod-shaped member 2A to expand and contract in the direction of the central axis. Also in this case, a portion at which the cover 20A makes contact with the engagement portion 87A of the second terminal member 23A may be fixed by welding on the opposite driving side.

(Second Modification)

Figure 8:
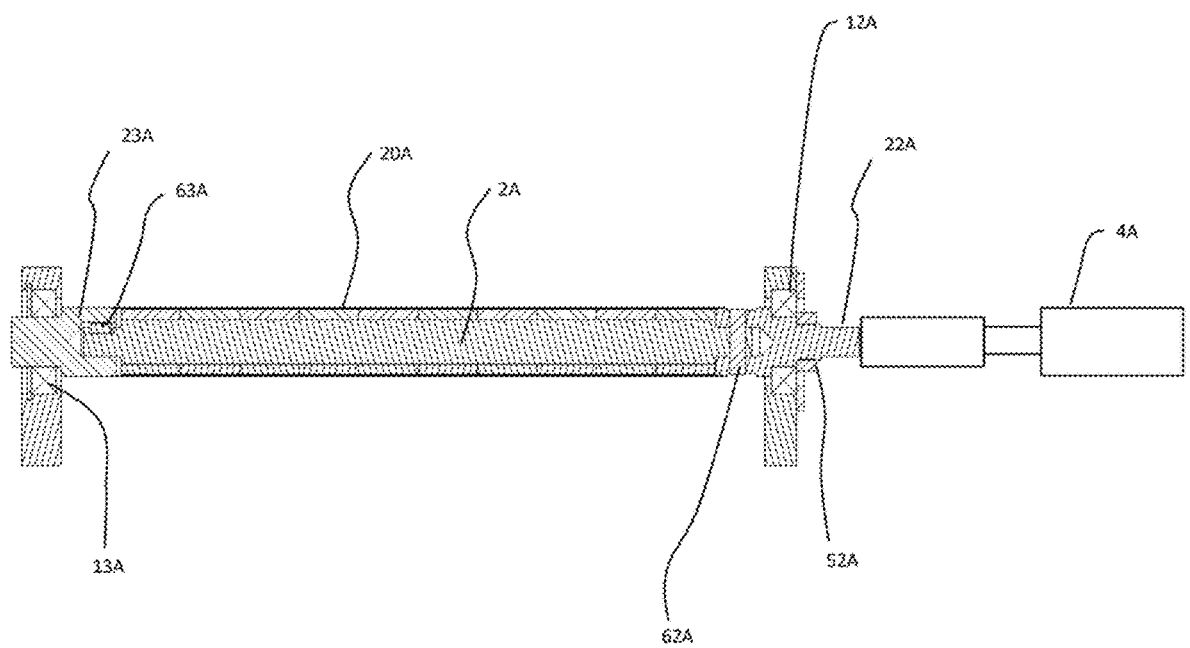
FIG. 8 is a schematic cross-sectional view illustrating a transfer apparatus according to a second modification of the embodiment of the invention.
Figure 9:
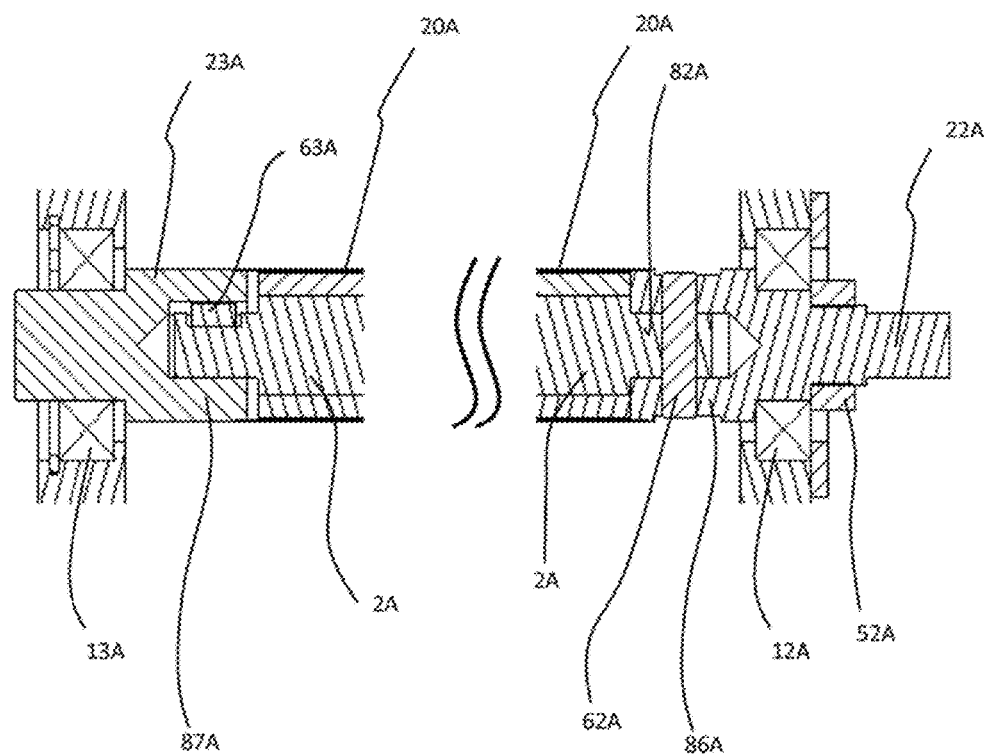
FIG. 9 is a schematic cross-sectional view illustrating the transfer apparatus according to the second modification of the embodiment of the invention.
Figure 10:
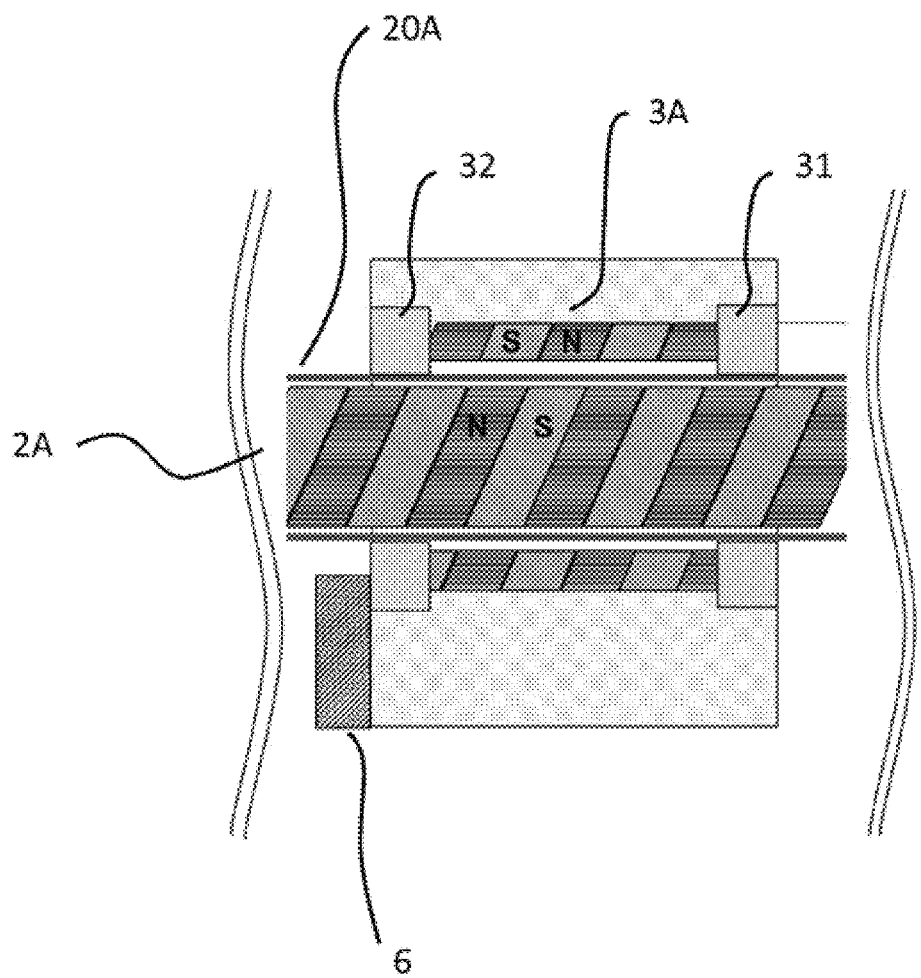
FIG. 10 is a schematic view illustrating a rod-shaped member and an opposite member according to the second modification of the embodiment of the invention.

FIG. 2 to FIG. 7 illustrate the rod-shaped member 2A provided with threads. In contrast, as illustrated in FIG. 8 and FIG. 9, the outer peripheral surface of the rod-shaped member 2A may be provided with S pole magnetized zones and N pole magnetized zones alternately in a spiral shape. The pitch of the magnetized zones of the rod-shaped member 2A illustrated in FIG. 10 is substantially the same as the pitch of the magnetized zones of the opposite member 3A. When the rod-shaped member 2A is rotated, a magnetic force acts between the magnetized zones of the rod-shaped member 2A and the magnetized zones of the opposite member 3A and the opposite member 3A moves.

Figure 11:
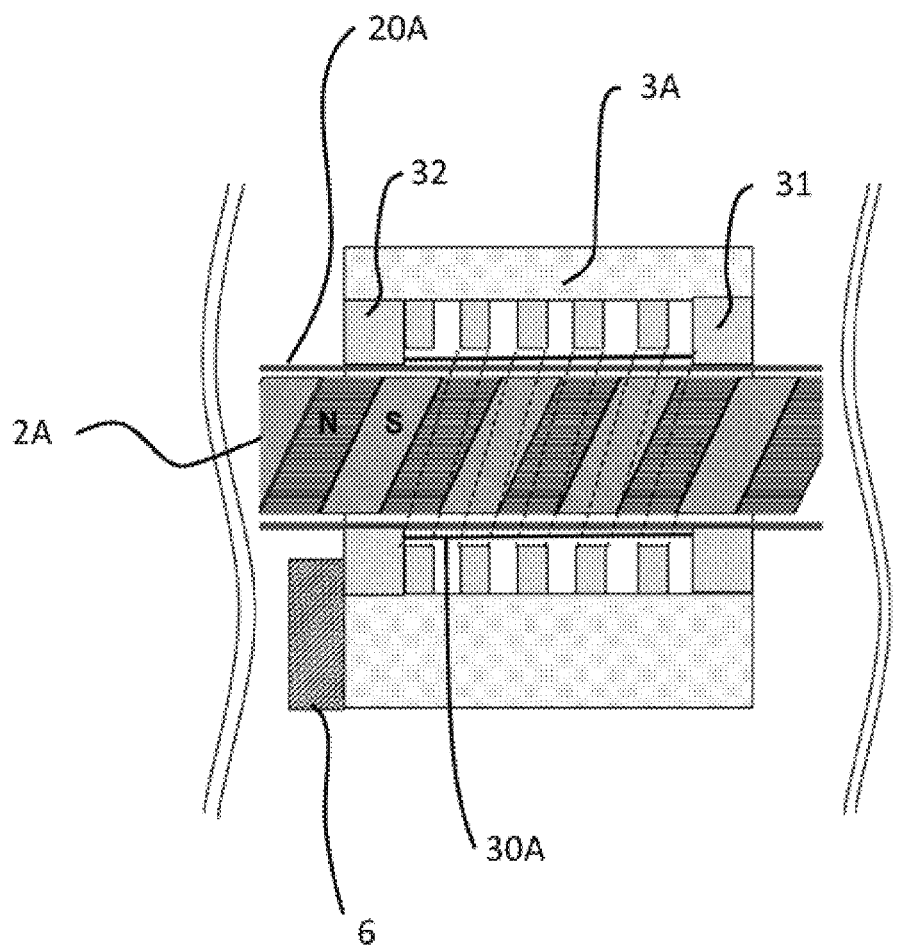
FIG. 11 is a schematic view illustrating the rod-shaped member and the opposite member according to the second modification of the embodiment of the invention.

Alternatively, as illustrated in FIG. 11, the opposite member 3A may be a threaded magnetic material. The surface of a threaded hole in the opposite member 3A may be covered with a nonmagnetic thin-walled pipe 30A. This can prevent foreign matters from adhering to the threaded groove of the opposite member 3A. The structure of the rod-shaped member 2A is the same as that of FIG. 10. The pitch of the threads of the opposite member 3A illustrated in FIG. 11 is substantially the same as the pitch of the magnetized zones of the rod-shaped member 2A. When the rod-shaped member 2A is rotated, a magnetic force acts between the magnetized zones of the rod-shaped member 2A and the threads of the opposite member 3A and the opposite member 3A moves.

Other Embodiments

As described above, the invention has been described by way of the embodiment, but it should not be understood that the description and the drawings that are parts of the disclosure limit the invention. It must be apparent to those skilled in the art that various alternative embodiments, examples, and operational techniques are clarified based on the disclosure. For example, the shape of the opposite member is not limited to the nut shape, but may be, for example, a concave shape. In this case, the rod-shaped member passes through the concave portion of the concave opposite member. S pole magnetized zones and N pole magnetized zones are alternately provided on the side surface of the concave portion of the concave opposite member. In addition, the storage housing may be a sterilization processing furnace or a fermenting furnace or may be a storage housing that does not undergo temperature management. In addition, the articles transferred to the inside and the outside of the storage housing are not limited to medicines, but may include foods, beverages, precision parts, etc., as well as any articles. In addition, the transfer apparatus is not necessarily combined with the storage housing. As described above, it should be understood that the invention encompasses various embodiments and the like not described in the specification.

REFERENCE SIGNS LIST

1: storage housing
2A, 2B: rod-shaped member
3A, 3B: opposite member
4A, 4B: driving device
5: article
6: contact member
7: shelf board
12A, 12B, 13A, 13B: bearing
15: transfer apparatus
20A: cover
22A: first terminal member
23A: second terminal member
30A: thin-walled pipe
31: guide ring 42A, 43A, 44A: welded portion
52A: bearing nut
62A: fastening pin
63A: key
82A: projection
84A, 85A: concave portion
86A, 87A: engagement portion
88A, 88B, 89A: mandrel portion

The invention claimed is:

1. A transfer apparatus comprising:
a rod-shaped member that comprises a magnetic material;
a cover configured to cover the rod-shaped member, the cover being made of a nonmagnetic material;
a first terminal member configured to allow insertion of one end portion of the rod-shaped member;
a second terminal member configured to allow insertion of another end portion of the rod-shaped member; and
a driving device configured to be connected to the first terminal member and rotate the rod-shaped member about a central axis of the rod-shaped member,
wherein the rod-shaped member and the first terminal member are fixed to each other,
the cover and the first terminal member are fixed to each other,
the rod-shaped member and the second terminal member are not fixed to each other, and
the cover and the second terminal member are fixed to each other.

2. The transfer apparatus according to claim 1,
wherein a concave portion configured to allow insertion of the other end portion of the rod-shaped member is provided in the second terminal member, and
an insertion depth of the other end portion of the rod-shaped member is smaller than a depth of the concave portion of the second terminal member, so that an end surface surrounding the concave portion of the second terminal member does not make contact with the rod-shaped member.

3. The transfer apparatus according to claim 1,
wherein the rod-shaped member and the first terminal member are fixed to each other by welding.

4. The transfer apparatus according to claim 1,
wherein the rod-shaped member and the first terminal member are fixed to each other by a fastening pin.

5. The transfer apparatus according to claim 1,
wherein the rod-shaped member makes contact with the second terminal member via a key.

6. The transfer apparatus according to claim 1,
wherein the first terminal member and the second terminal member are made of a nonmagnetic material.

7. The transfer apparatus according to claim 1,
wherein the cover and the first terminal member are fixed to each other by welding.

8. The transfer apparatus according to claim 1,
wherein the cover and the second terminal member are fixed to each other by welding.

9. The transfer apparatus according to claim 1, further comprising:
a first bearing configured to receive a load of the first terminal member; and
a second bearing configured to receive a load of the second terminal member.

10. The transfer apparatus according to claim 1, further comprising:
an opposite member configured to face a part of a side surface of the rod-shaped member, the opposite member comprising a magnetic material,
wherein the opposite member is configured to move along the central axis of the rod-shaped member when the driving device rotates the rod-shaped member.

11. A storage apparatus comprising:
a storage housing that stores an article;
a rod-shaped member that comprises a magnetic material;
a cover configured to cover the rod-shaped member, the cover being made of a nonmagnetic material;
a first terminal member configured to allow insertion of one end portion of the rod-shaped member;
a second terminal member configured to allow insertion of another end portion of the rod-shaped member;
an opposite member configured to face a part of a side surface of the rod-shaped member, the opposite member comprising a magnetic material,
a driving device configured to be connected to the first terminal member, rotate the rod-shaped member about a central axis of the rod-shaped member, and change a relative position between the rod-shaped member and the opposite member; and
a contact member configured to move in the storage housing with a change in the relative position between the rod-shaped member and the opposite member and moves the article while making contact with the article,
wherein the rod-shaped member and the first terminal member are fixed to each other,
the cover and the first terminal member are fixed to each other,
the rod-shaped member and the second terminal member are not fixed to each other, and
the cover and the second terminal member are fixed to each other.

12. The storage apparatus according to claim 11,
wherein a concave portion configured to allow insertion of the other end portion of the rod-shaped member is provided in the second terminal member, and
an insertion depth of the other end portion of the rod-shaped member is smaller than a depth of the concave portion of the second terminal member, so that an end surface surrounding the concave portion of the second terminal member does not make contact with the rod-shaped member.

13. The storage apparatus according to claim 11,
wherein the first terminal member and the second terminal member are made of a nonmagnetic material.

14. The storage apparatus according to claim 11, further comprising:
a first bearing configured to receive a load of the first terminal member; and
a second bearing configured to receive a load of the second terminal member.

15. The storage apparatus according to claim 11,
wherein the driving device is disposed outside the storage housing.

16. The storage apparatus according to claim 11,
wherein the rod-shaped member, the opposite member, and the contact member are disposed in the storage housing.

17. The storage apparatus according to claim 11,
wherein the storage housing is a temperature-controlled furnace having a temperature-controlled space.

* * * * *